2 Sheets—Sheet 1.

R. WHITEHILL.

SEWING-MACHINE.

No. 7,762. Reissued June 19, 1877.

Witnesses
John Barker
Geo. Haynes

Inventor
Robert Whitehill
by his Attorneys
Brown & Allen

2 Sheets—Sheet 2.

R. WHITEHILL.

SEWING-MACHINE.

No. 7,762. Reissued June 19, 1877.

Witnesses
John Becker
Geo. Haynes

Inventor.
R. Whitehill
by his Attorneys
Brown & Allen

UNITED STATES PATENT OFFICE.

ROBERT WHITEHILL, OF NEW YORK, N. Y.

IMPROVEMENT IN SEWING-MACHINES.

Specification forming part of Letters Patent No. 166.172, dated July 27, 1875; reissue No. 7,762, dated June 19, 1877; application filed October 25, 1876.

*To all whom it may concern:*

Be it known that I, ROBERT WHITEHILL, of the city, county, and State of New York, have invented certain Improvements in Sewing-Machines; and I do hereby declare that the following is a full, clear, and exact description of the same, reference being had to the accompanying drawing, which forms part of this specification.

The invention consists in a combination, with an oscillating needle-thread controller or take-up, of a stationary bar or pin, made to occupy an eccentric position relatively with the arbor or axis of vibration of the take-up, and so that the needle-thread is deflected over said bar by the take-up as the latter completes its stroke in concert with the upward stroke of the needle. An oscillating take-up thus made to operate in connection with an eccentrically-disposed bar or pin provides alike for delivery of the thread at a proper time and in suitable amount, without forming unnecessary slack, and for a tightening action on the needle-thread when the stitch is formed.

The invention also consists in an oscillating take-up, made adjustable around the arbor by which it is operated, whereby provision is made for adjusting the take-up to suit different thicknesses of fabric.

The invention further relates to certain improvements in that kind of needle-motion in which the needle is driven by sun and planet gearing; and this part of the invention consists in certain novel constructions and combinations of the parts of such a needle-motion, whereby a more direct application of the driving-power is provided for, and the needle is made to work with the same velocity in its upward stroke as in its downward stroke, and the machine is enabled to be driven at a very high speed.

The invention likewise consists in a combination of mechanism in a sewing-machine having its needle-bar or carrier actuated by sun and planet gears arranged at the forward end or in front of the actuating-shaft, whereby said actuating shaft and the shuttle driving-shaft, which are geared together by level-gears, are in like vertical planes, and the shuttle-driver, which is actuated by a crank on the shuttle-driving shaft, works parallel with the actuating-shaft, thus enabling the machine to be run at a high velocity with perfect steadiness and accuracy.

Figure 1:
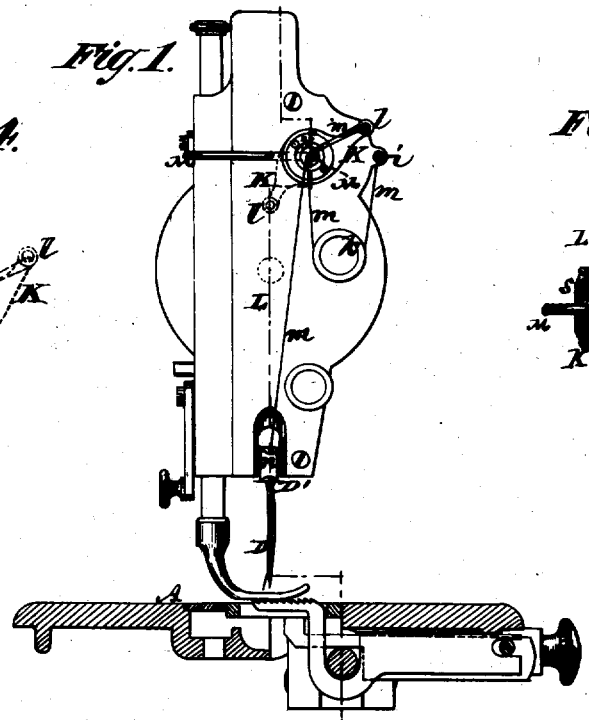
Figure 4:
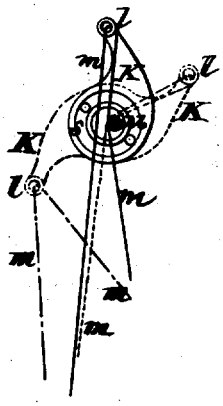
Figure 5:
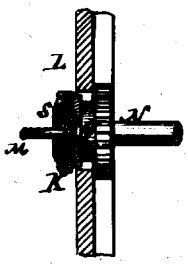
Figure 3:
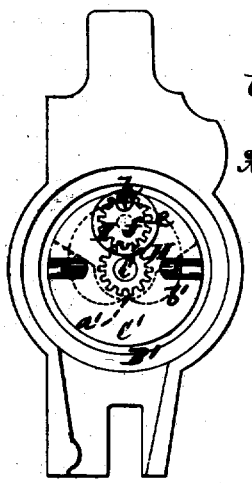
Figure 2:
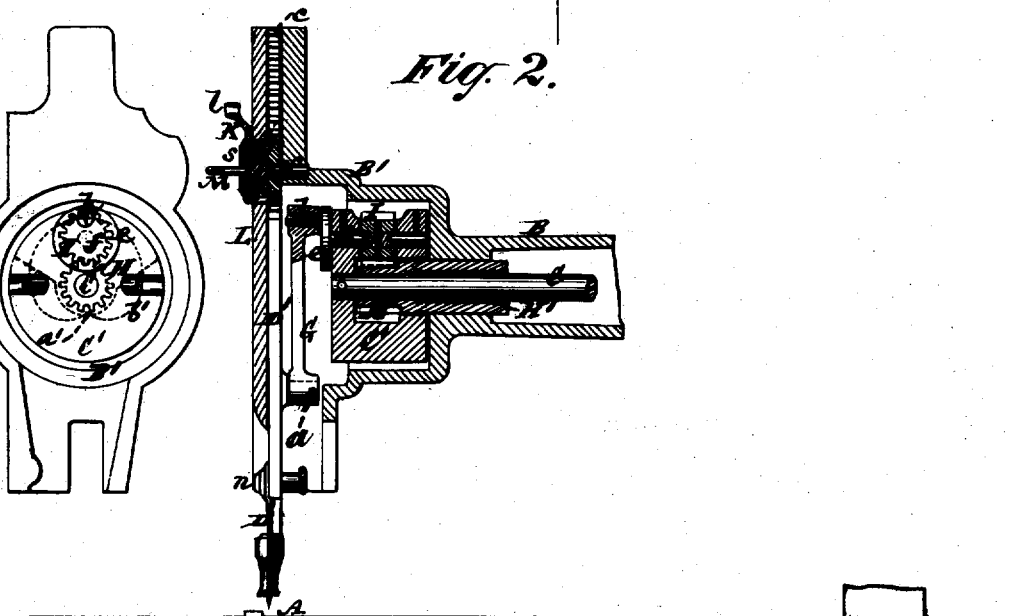
Figure 6:
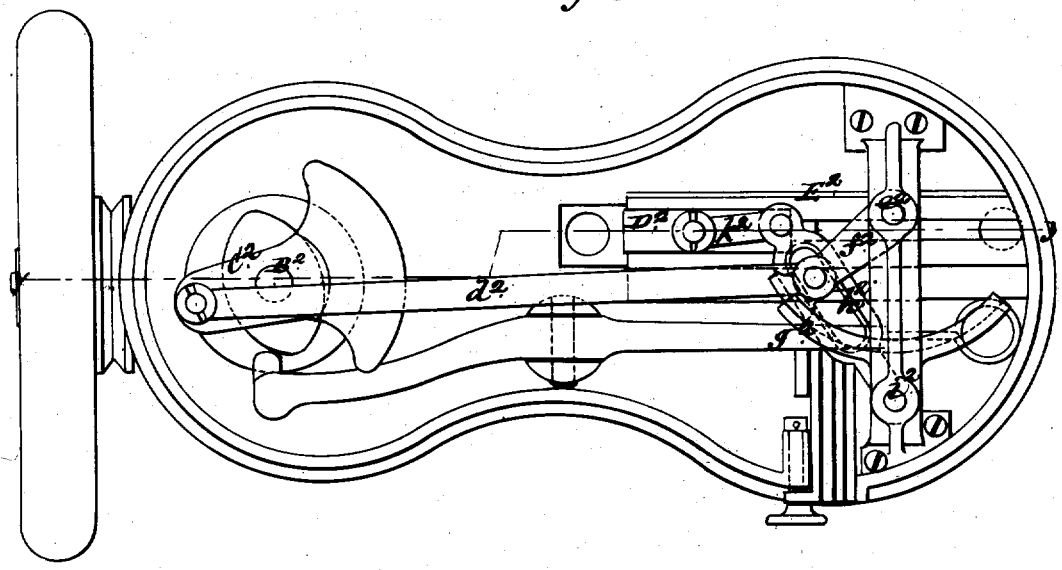
Figure 7:
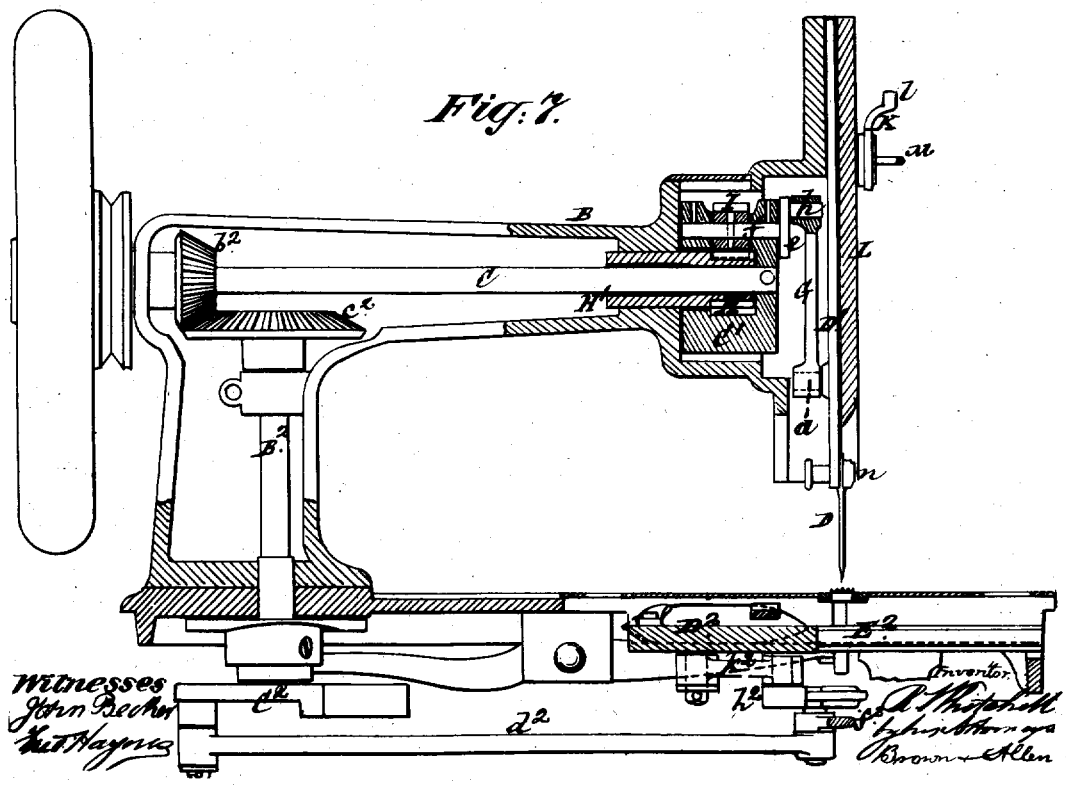

In the accompanying drawing, Figure 1 represents a partly-sectional head or forward-end view of a shuttle sewing-machine in part, having my improvements applied. Fig. 2 is a vertical section, at right angles to Fig. 1, of the same. Fig. 3 is a front or face view of the head of the machine with the face-plate of said head removed. Fig. 4 is a face view, upon a larger scale, of the take-up, showing the same, by full and dotted lines, in different working positions in relation with a stationary eccentric bar or pin, with which it is combined and operated; and Fig. 5 is a vertical section of said oscillating take-up at right angles to Fig. 4, and on a corresponding scale therewith. Fig. 6 is an inverted plan of the machine; and Fig. 7 is a vertical section thereof, mainly on the irregular line *y y*.

A is the cloth bed or table of the machine. D is the sewing-needle, carried by a straigh bar, arranged to work up and down within a groove in the back of the face-plate L on the head or forward end of the stationary arm of the machine.

C in the actuating-shaft, arranged to run lengthwise through the goose-neck or stationary arm B of the machine, and serving to give motion to the needle-bar $D^1$, also, through the needle-bar, to the curvilinearly reciprocating or oscillating take-up K.

The needle-bar $D^1$ is reciprocated by means of a connecting-rod, G, which receives its motion from an eccentric pin, *h*, on or connected with a planet-wheel carried by a hollow hub, $C^1$, on the front end of the actuating-shaft C, and gearing with a stationary circular rack or sun-wheel, which is concentric with said shaft.

In further description of the needle motion, H represents the fixed sun-wheel, and I the planet-wheel gearing therewith. These gears are arranged in such manner that the shaft C terminates in rear of the needle bar or carrier, which latter is arranged to occupy an approximate or true central position relatively with the actuating-shaft in front of the end thereof.

Furthermore, the rod G, which operates the needle-bar $D^1$ from or by the eccentric pin *h*, makes its working connection in front of the actuating-shaft C, and consequently has a more direct action on the needle than when vibrating more on one side of said shaft than the other side thereof, and a straight connecting-rod may be used, both it and the needle-bar or carrier being in front of the forward end of the actuating-shaft C. By this specified arrangement of the sun and planet gears in relation with the actuating-shaft and needle bar or carrier the epicycloidal motion of the eccentric or wrist pin *h*, which is connected with the planet-wheel I, that rolls around the sun-wheel H, admits of the pin *h* being set so that it not only gives the necessary rapid motion to the needle during its movement when out of the cloth, and produces the requisite retardation of the needle while it is in the cloth for the passage of the shuttle through the loop, but also admits of an approximately-central dwell, or slight up-and-down motion of said pin relatively with the line of the needle, as shown at *a'* in the dotted line $b^1$, Fig. 3, which line represents the path described by the pin *h*. Said eccentric or wrist pin *h* is attached to a disk, *e*, fast on the forward end of the shaft *f* of the planet-wheel I, and the arrangement of the connection of the needle-bar in advance of the forward end of the actuating-shaft C admits of the whole length of the pin *a*, by which the connecting-rod G is attached to the needle-bar, and the whole length of the wrist-pin *h*, being brought between the same planes, perpendicular to the axes of the said pins, and therefore produces a very nearly direct action of the said crank-pin and its connecting-rod upon the needle-bar. The planet-wheel I and its shaft *f* are carried in and by the hub or projection $C^1$, which is fast on the forward end of the actuating-shaft C, and is constructed of a sleeve form, running in a backward direction over the sun-wheel H, whereby an extended planet-wheel shaft, *f*, may be used, and bearings be formed in said hub or projection for the said shaft on opposite sides of the planet-gear. The sun-wheel H is constructed to contain a bearing H', for the actuating-shaft C inside of the hub or projection $C^1$. The head $B^1$ of the stationary arm B forms a hollow case or box, which protects the sun and planet gears and other parts from injury, and which furthermore catches any oil or lubricating material thrown off from said contained devices.

The curvilinearly reciprocating or oscillating take-up K is operated by the needle-bar $D^1$ in a positive manner, directly from the latter, by means of a rack, *c*, on said bar, arranged to gear with a pinion, *g*, on the arbor N of the take-up, which latter is disposed in front of the face-plate L, within which the needle-bar works. The take-up has its axis of vibration on one side of the needle-bar. Said take-up K has combined with it a stationary pin or bar, M, arranged eccentrically in relation with the center of the oscillating take-up. The needle-thread *m* is represented as passing through an eye, *i*, down to and round a tension device, *k*, below the take-up, and from thence to and on one side of the stationary bar, wire, or pin M. The needle-thread is then continued to and through the eye *l* of the take-up at any suitable distance from the axis of the latter, and from thence to the needle D, passing through a guide, *n*, on the needle-bar.

The eye *l* of the take-up is constructed and arranged so that the thread *m* passes through it in a direction parallel with the axis of vibration of the take-up, whereby the loop or bend of the thread produced by the passage of it through said eye has its two sides or lines separated a distance equal to the length of the eye. This prevents the two lines of the thread crossing each other in contact and producing friction and wear on each other, as well as irregular sewing.

By the take-up K having its carrying stud or arbor N arranged to project at right angles from the face of the head or forward end of the stationary arm of the machine, the take-up K is caused to oscillate in front of the face plate L, and in a plane parallel therewith, and the needle-bar and the gear *g*, operated by said bar or its rack *c*, lie with their faces between the face-plate L and the head of the machine. This brings the eye *l* of the take-up, when in its extreme uppermost position, nearly directly over the needle, so that the thread *m* draws nearly on a straight line between the eye of the needle and the eye of the take-up. This arrangement of the take-up also, relatively to the face-plate L, causes the slack of the thread, when delivered by the take-up, to be cast toward the rear side of the machine—that is, the side opposite to that which is occupied by the operator when working the machine. There consequently is no danger of the slack thread interfering with the operator handling the work to be sewed.

Referring again to the bar or pin M, when used in connection with the oscillating take-up, both lines of the needle-thread *m* are on the back or inside surface of the bar or pin M when the stitch is being tightened. This stationary bar or pin M, which forms a thread-guide, is suitably bent to provide for its attachment to the edge of the face-plate L.

The eye *l* of the oscillating take-up K travels backwardly over and down and below the pin or portion of the bar M which occupies an eccentric relation with the take-up, and over which the needle-thread is bent or deflected in or by the back action of the take-up.

The two extreme positions of the take-up are represented by full and dotted lines in Fig. 1 and by dotted lines in Fig. 4. When the sewing-needle is fully down, or as it commences to make its upstroke, then the eye *l* of the take-up occupies the lowest position represented for it by dotted lines in Figs. 1 and 4, in assuming which position—that is, in traveling from its upper dotted position to its lowermost one—it has provided for the free delivery of the thread in suitable amount without forming unnecessary slack for the needle in its downstroke to carry through the cloth. As the sewing-needle ascends, however, the take-up K, in starting from its lowermost dotted position, at first takes up slowly the slack of the needle-thread, thereby allowing the needle to form the loop, also giving ample time for the passage of the shuttle through the loop, and, as the needle continues its ascent, said take-up afterward moves more rapidly, and continues to take up the slack till the needle is out of the cloth and the stitch is tightened, the take-up K then assuming its highest position, with its eye *l* directly over the center of the take-up, as represented by full lines in Fig. 4. After this said take-up K still continues its further backward movement till it reaches the position shown for it by dotted lines to the right in Fig. 4, and by full lines in Fig. 1. During this completion of the backward movement of the take-up, which takes place during the operation of the feed, the bar or pin M, owing to its being arranged eccentrically to the center of the motion of the take-up, while it prevents such slackening of the thread as would interfere with the proper operation of the needle in its next descent, allows the thread to slacken sufficiently to prevent it from holding back the cloth against the operation of the feed.

The take-up K is made adjustable on or around its arbor N, to set its eye *l* more or less backward or forward relatively to the stationary bar or pin M, whereby provision is made for adapting the take-up to deliver the slack thread sooner or later, to suit different thicknesses of cloth. A clamping-nut, *s*, serves to secure the take-up in the position to which it has been adjusted around its arbor.

Referring, in the next instance, more particularly to Figs. 6 and 7 of the drawing, the actuating-shaft C, in front of which the needle-bar $D^1$ is worked by sun and planet gears, as described, has mounted on it, near its back end, a bevel-wheel, $b^2$, which gears with a bevel-wheel, $c^2$, on an upright shaft, $B^2$, which is in the same vertical plane with the actuating-shaft C. This upright shaft $B^2$ carries at its lower end a crank, $C^2$, which serves to operate the shuttle-driver $D^2$, that is arranged to work within the race $E^2$ parallel with the actuating-shaft C. By this combination and arrangement of said parts the machine may be run at a high velocity with perfect steadiness and accuracy. The means for communicating motion from the crank $C^2$ to the shuttle-driver $D^2$ consist of a connecting-rod, $d^2$, operated by the crank $C^2$, and connected near the shuttle end of the machine with a curvilinearly-reciprocating slide, $f^2$, which has its center of motion at $e^2$, and is supported at its outer end in a curved guide, $g^2$. This slide $f^2$ operates a slotted lever, $h^2$, having its fulcrum at $i^2$, and connected at its free end, by a connecting link, $k^2$, with the shuttle-driver $D^2$.

I claim—

1. In combination with the oscillating take-up K, the stationary bar or pin M, arranged to occupy an eccentric position relatively with the arbor N or axis of oscillation of the take-up, substantially as specified.

2. The combination, with the oscillating take-up arbor N and the mechanism for oscillating the same positively, of the take-up K, movable around said arbor to provide for adjusting it to different thicknesses of fabric, substantially as herein described.

3. The combination of the needle bar or carrier $D^1$, the actuating-shaft C, the sun and planet gears H I, and means of attaching the planet-gear to the said shaft, the said bar or carrier being placed in front of the said gears, and also in front of the end of the shaft, substantially as and for the purpose herein described.

4. The combination of the actuating-shaft C, the sun and planet gears H I, the eccentric or wrist pin *h*, the connecting-rod G, and means of attaching the planet-gear and pin *h* to said shaft, with the needle-bar $D^1$, placed in central relation with the said shaft, substantially as and for the purpose herein specified.

5. The combination of the actuating-shaft C, the sun and planet gears H I, the wrist or pin *h*, and the shaft *f*, which carries the planet-gear and pin *h*, with the hub $C^1$, containing bearings for the said shaft on the opposite sides of the planet-gear, substantially as herein described.

6. In a sewing-machine in which the needle bar or carrier, actuated by sun and planet gears, is arranged in front of the actuating-shaft C, the combination, with such actuating-shaft and a shuttle-driver, $D^2$, working parallel therewith, of an upright shaft, $B^2$, geared at its upper end, by bevel-gears $b^2$ $c^2$, with the said actuating-shaft, and having at its lower end a crank connected with the shuttle-driver, for operation of the latter, substantially as specified.

ROBERT WHITEHILL.

Witnesses:
HENRY T. BROWN,
MICHAEL RYAN.